US012670860B2

(12) United States Patent
Sang

(10) Patent No.: US 12,670,860 B2
(45) Date of Patent: Jun. 30, 2026

(54) DISPLAY APPARATUS AND DRIVING METHOD THEREOF

(71) Applicant: LG Display Co., Ltd., Seoul (KR)

(72) Inventor: WooKyu Sang, Paju-si (KR)

(73) Assignee: LG Display Co., Ltd, Seoul (KR)

( * ) Notice: Subject to any disclaimer, the term of this patent is extended or adjusted under 35 U.S.C. 154(b) by 0 days.

(21) Appl. No.: 19/091,330

(22) Filed: Mar. 26, 2025

(65) Prior Publication Data

US 2025/0322796 A1 Oct. 16, 2025

(30) Foreign Application Priority Data

Apr. 15, 2024 (KR) ........................ 10-2024-0050105

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0247* (2013.01); *G09G 2340/0435* (2013.01)

(58) Field of Classification Search
CPC ... G09G 2300/0819; G09G 2300/0842; G09G 2300/0861; G09G 2310/08; G09G 2320/0247; G09G 2340/0435; G09G 3/3233
See application file for complete search history.

(56) References Cited

U.S. PATENT DOCUMENTS

| | | | | |
|---|---|---|---|---|
| 2020/0226978 A1* | 7/2020 | Lin | H10K 59/1213 | |
| 2022/0101785 A1* | 3/2022 | Chung | G09G 3/3208 | |
| 2023/0079102 A1* | 3/2023 | Kim | G09G 3/3233 | 345/204 |
| 2023/0143180 A1* | 5/2023 | Song | G09G 3/3291 | 345/691 |
| 2023/0154405 A1* | 5/2023 | Noh | G09G 3/3233 | 345/204 |

* cited by examiner

*Primary Examiner* — Robin J Mishler
(74) *Attorney, Agent, or Firm* — Fenwick & West LLP

(57) ABSTRACT

A display apparatus includes a display panel including a pixel, a source driver outputting a data voltage supplied to the pixel, in a refresh frame and stop the output of the data voltage in at least one skip frame succeeding the refresh frame, and a bias controller configured to output a first on-bias stress voltage to the pixel, in the refresh frame and output a second on-bias stress voltage to the pixel, in the at least one skip frame. The first and second on-bias stress voltages are applied to one electrode of a driving transistor included in the pixel so as to improve a luminance difference caused by a leakage characteristic variation of the pixel, and the first and second on-bias stress voltages are different so that a threshold voltage characteristic of the driving transistor differs in the refresh frame and the at least one skip frame.

18 Claims, 16 Drawing Sheets

FIG. 12A
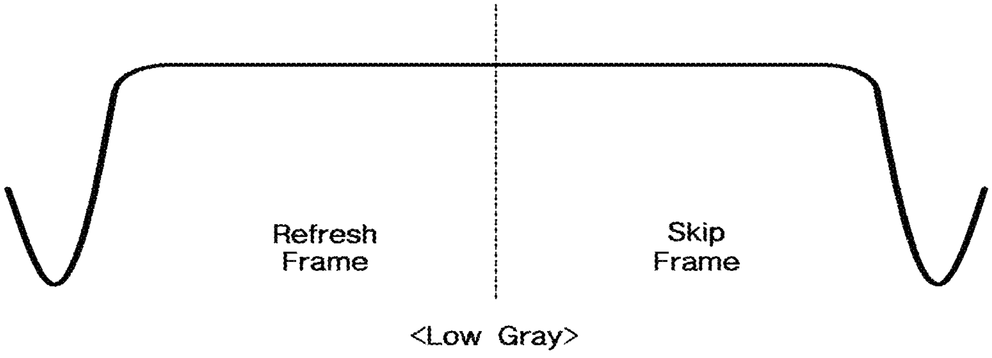
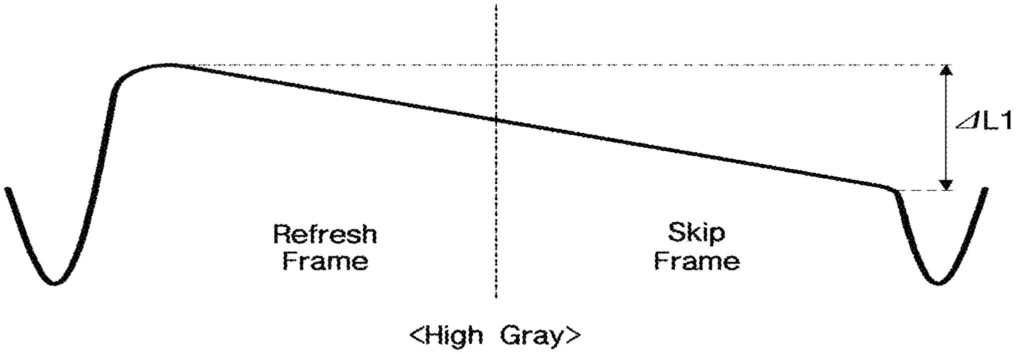
FIG. 12B

FIG. 13A
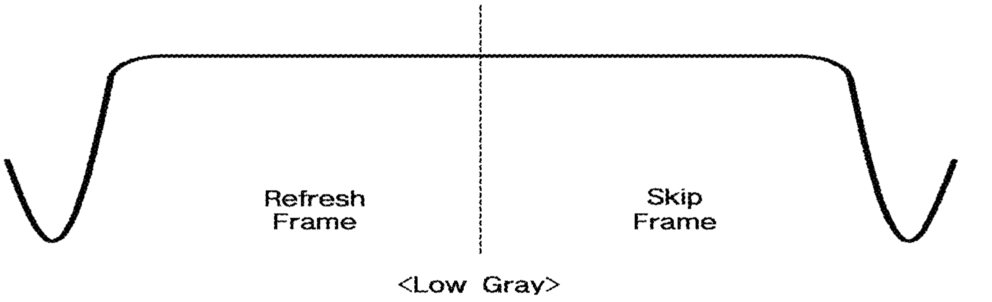
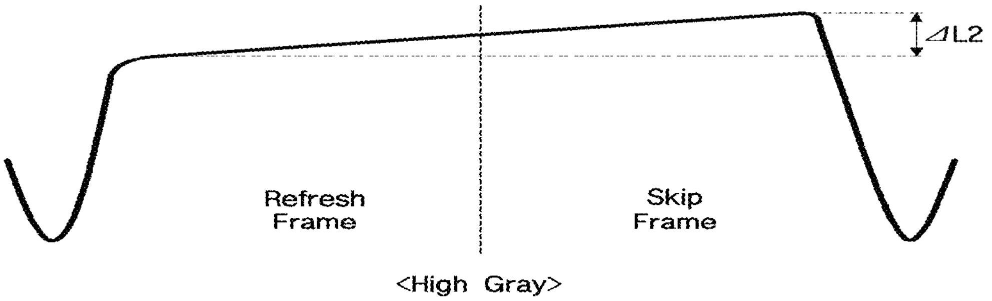
FIG. 13B

DISPLAY APPARATUS AND DRIVING METHOD THEREOF

CROSS-REFERENCE TO RELATED APPLICATION

This application claims the benefit of the Republic of Korea Patent Application No. 10-2024-0050105 filed on Apr. 15, 2024, which is hereby incorporated by reference in its entirety.

BACKGROUND

Field of Technology

The present disclosure relates to a display apparatus and a driving method thereof.

Discussion of the Related Art

Display apparatuses include a plurality of pixels arranged as a matrix type and implement luminance corresponding to image data by using the pixels. In display apparatuses, technology where a refresh rate varies based on an attribute of an image has been known. Refresh rate variable technology increases a data refresh cycle as a variation of an image is reduced, and thus, decreases power consumption.

A data refresh operation is performed in a refresh frame and is not performed in a skip frame. As the number of skip frames provided between adjacent refresh frames increases, a data refresh cycle increases, and low-speed driving is implemented.

Due to a leakage characteristic variation occurring in pixels, a luminance deviation between a refresh frame and a skip frame may occur.

Such a luminance deviation is more considerable in low-speed driving where a data refresh cycle is long, and due to this, may be recognized as flicker.

SUMMARY

To overcome the aforementioned problem of the related art, the present disclosure may provide a display apparatus and a driving method thereof, which may decrease a luminance deviation occurring between a refresh frame and a skip frame and may thus enhance display quality.

To achieve these objects and other advantages and in accordance with the purpose of the disclosure, as embodied and broadly described herein, a display apparatus includes: a display panel including at least one pixel; a source driver configured to output a data voltage, which is to be supplied to the at least one pixel, in a refresh frame and stop the output of the data voltage, which is to be supplied to the at least one pixel, in at least one skip frame succeeding the refresh frame; and a bias controller configured to output a first on-bias stress voltage, which is to be supplied to the at least one pixel, in the refresh frame and output a second on-bias stress voltage, which is to be supplied to the at least one pixel, in the at least one skip frame, wherein the first and second on-bias stress voltages are applied to one electrode of a driving transistor included in the at least one pixel so as to improve a luminance difference caused by a leakage characteristic variation of the at least one pixel, and the first and second on-bias stress voltages are differently set so that a threshold voltage characteristic of the driving transistor differs in the refresh frame and the at least one skip frame.

A voltage difference between the first on-bias stress voltage and the second on-bias stress voltage may be determined based on the number of skip frames succeeding the refresh frame.

A voltage difference between the first on-bias stress voltage and the second on-bias stress voltage may increase in proportion to the number of skip frames succeeding the refresh frame.

When the number of skip frames succeeding the refresh frame is in plurality, the second on-bias stress voltages corresponding to the plurality of skip frames may be equal to one another.

When the number of skip frames succeeding the refresh frame is in plurality, the second on-bias stress voltages corresponding to the plurality of skip frames may differ.

When a luminance of the at least one skip frame is lower than a luminance of the refresh frame, the second on-bias stress voltage may be lower than the first on-bias stress voltage.

When a luminance of the at least one skip frame is higher than a luminance of the refresh frame, the second on-bias stress voltage may be higher than the first on-bias stress voltage.

The display apparatus may further include a gate driver configured to supply the at least one pixel with an emission control signal based on pulse width modulation so as to control an on and off timing of a light emitting device included in the at least one pixel, wherein an off duty cycle of the emission control signal may include a first off duty cycle and a second off duty cycle which is longer than the first off duty cycle.

The first off duty cycle may be provided between on duty cycles of the refresh frame and on duty cycles of the at least one skip frame, and the second off duty cycle may be provided immediately before a first on duty cycle of the refresh frame, immediately after a last on duty cycle of the at least one skip frame, and between a last on duty cycle of the refresh frame and a first on duty cycle of the at least one skip frame.

The on duty cycles of the emission control signal may be equal to each other in the refresh frame and the at least one skip frame.

In another embodiment of the present disclosure, a driving method of a display apparatus, including a display panel including at least one pixel, includes: outputting a data voltage, which is to be supplied to the at least one pixel, in a refresh frame and stopping the output of the data voltage, which is to be supplied to the at least one pixel, in at least one skip frame succeeding the refresh frame; and outputting a first on-bias stress voltage, which is to be supplied to the at least one pixel, in the refresh frame and outputting a second on-bias stress voltage, which is to be supplied to the at least one pixel, in the at least one skip frame, wherein the first and second on-bias stress voltages are applied to one electrode of a driving transistor included in the at least one pixel so as to improve a luminance difference caused by a leakage characteristic variation of the at least one pixel, and the first and second on-bias stress voltages are differently set so that a threshold voltage characteristic of the driving transistor differs in the refresh frame and the at least one skip frame.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 12A, 12B, 13A, and 13B are diagrams illustrating an example where a luminance deviation occurring between a refresh frame and a skip frame is greater in a high gray level than a low gray level according to an embodiment of the present disclosure;

DETAILED DESCRIPTION

Figure 1:
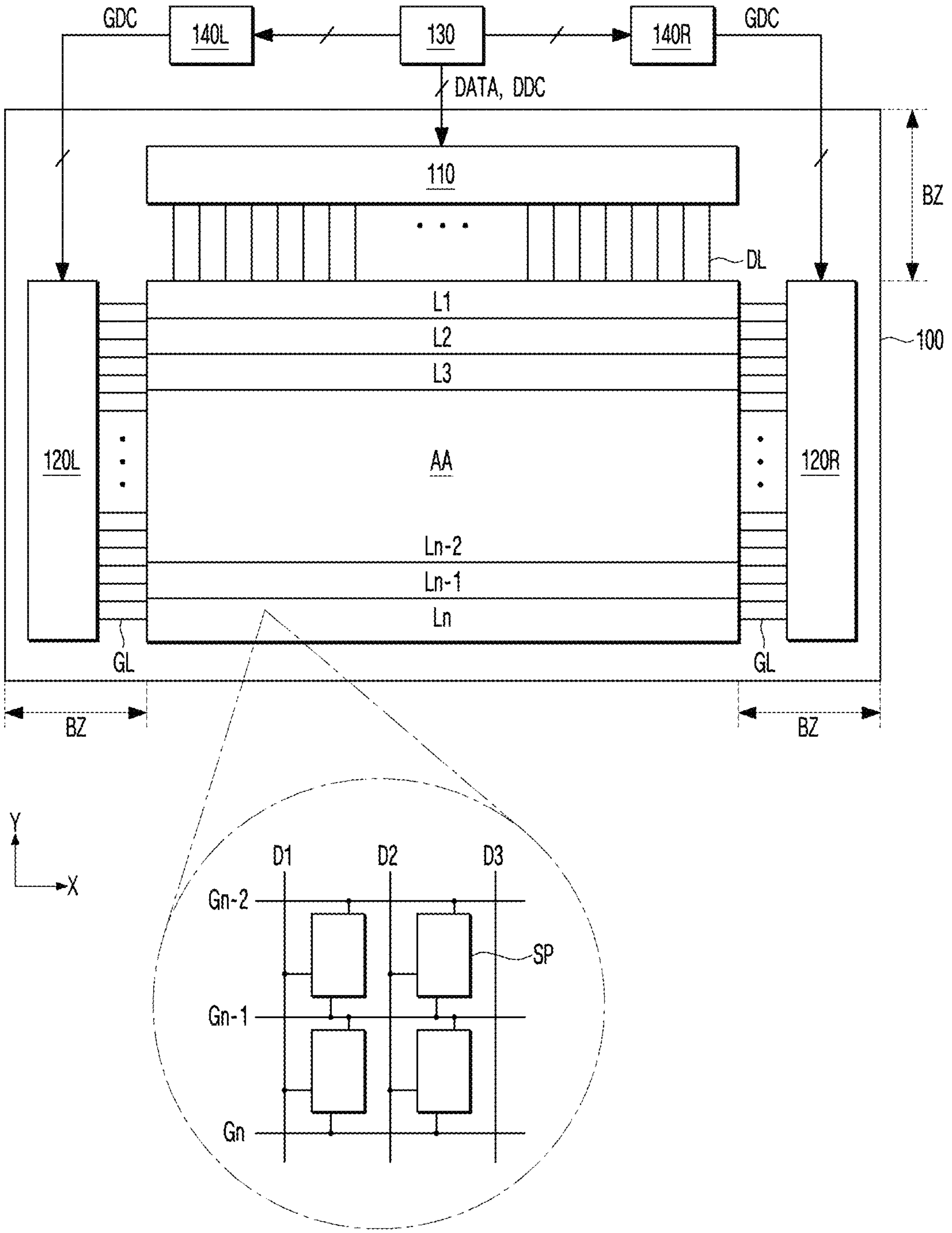
FIG. 1 is a block diagram illustrating a display apparatus according to an embodiment of the present disclosure.

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

Advantages and features of the present disclosure, and implementation methods thereof will be clarified through following embodiments described with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Furthermore, the present disclosure is only defined by scopes of claims.

The shapes, sizes, ratios, angles, numbers and the like disclosed in the drawings for description of various embodiments of the present disclosure to describe embodiments of the present disclosure are merely exemplary and the present disclosure is not limited thereto. Like reference numerals refer to like elements throughout. Throughout this specification, the same elements are denoted by the same reference numerals. As used herein, the terms "comprise", "having," "including" and the like suggest that other parts can be added unless the term "only" is used. As used herein, the singular forms "a", "an", and "the" are intended to include the plural forms as well, unless context clearly indicates otherwise.

Elements in various embodiments of the present disclosure are to be interpreted as including margins of error even without explicit statements.

In describing a position relationship, for example, when a position relation between two parts is described as "on~", "over~", "under~", and "next~", one or more other parts may be disposed between the two parts unless "just" or "direct" is used.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of the present disclosure.

In the following description, when the detailed description of the relevant known function or configuration is determined to unnecessarily obscure the important point of the present disclosure, the detailed description will be omitted. Hereinafter, embodiments of the present disclosure will be described in detail with reference to the accompanying drawings.

FIG. 1 is a block diagram illustrating a display apparatus according to an embodiment of the present embodiment.

Referring to FIG. 1, a display panel according to an embodiment of the present embodiment may be an organic light emitting display apparatus. A display panel 100 may include a screen AA which displays an input image. The screen AA may include a pixel array which displays pixel data (hereinafter referred to as "image data") DATA of an input image. The pixel array may include a plurality of data lines DL, a plurality of gate lines GL intersecting with the data lines DL, and a plurality of pixels SP.

The pixels SP may be arranged on the screen AA in a matrix type defined by intersections between the data lines DL and the gate lines GL. The pixels SP may be arranged as various types such as a stripe type and a diamond type on the screen AA, based on positions of the pixels SP emitting lights of the same color.

The pixel array may include a plurality of pixel columns and a plurality of pixel lines L1 to Ln intersecting with the pixel columns. Each of the pixel columns may include pixels SP which are arranged in a Y-axis direction. A pixel line may include pixels SP which are arranged in an X-axis direction. One vertical period may be one frame period needed for writing image data DATA of one frame in all pixels of the screen. One horizontal period may be a time obtained by dividing one frame period by the number of pixel lines L1 to Ln. One horizontal period may be a time needed for writing the image data DATA of one pixel line, sharing a gate line GL, in pixels SP of one pixel line.

Each of the pixels SP may include a red (R) subpixel, a green (G) subpixel, and a blue (B) subpixel for various color combinations. Each of the pixels SP may further include a white (W) subpixel.

Each of the pixels SP may be implemented with a pixel circuit connected to a data line DL and a gate line GL. The pixel circuit may include a light emitting device, a driving transistor, one or more switch transistors, and a capacitor. The light emitting device may be implemented as an organic light emitting diode (OLED). A driving current applied to the light emitting device may be controlled based on a gate-source voltage of the driving transistor. The gate-source voltage of the driving transistor may be determined by a data voltage corresponding to the image data DATA. In FIG. 1, "D1 to D3" illustrated in a circle may be data lines, and "Gn-2 to Gn" may be gate lines. Each of the pixels SP of FIG. 1 may be further connected to a front-end gate line as well as a current-end gate line. For example, each of pixels SP disposed in an $n^{th}$ pixel line Ln may be connected to a front-end gate line Gn-1 as well as an $n^{th}$ gate line Gn.

The pixel circuit may sample a threshold voltage of the driving transistor in the middle of a pixel programming operation which is performed in one frame period and may allow a sampled threshold voltage to be reflected in a gate-source voltage (hereinafter referred to as Vgs) of the driving transistor, and thus, may prevent a driving current from being distorted due to a threshold voltage variation of the driving transistor.

All semiconductor layers of transistors configuring the pixel circuit may include low-temperature polycrystalline silicon (hereinafter referred to as LTPS). An LTPS-type pixel circuit may be distinguished from a hybrid-type pixel circuit where some of the transistors includes LTPS, and the other transistors include oxide. The present embodiment may be for the LTPS-type pixel circuit.

The pixel circuit may be driven based on refresh rate variable technology. To implement the refresh rate variable technology, one or more skip frames may be provided between adjacent refresh frames. A refresh rate (i.e., a frame frequency) may be determined based on the number of skip frames provided between adjacent refresh frames.

A data refresh operation including pixel initialization and data programming may be performed in a refresh frame. The light emitting device may be turned off when performing a data refresh operation, and at this time, an anode reset operation where the light emitting device is initialized into an anode reset voltage may be performed.

A data refresh operation on the pixels SP may be omitted in a skip frame, and a data refresh condition Vgs (the driving current) which is set in a refresh frame may be maintained. An anode reset operation for turning off the light emitting device may be performed in the skip frame. Accordingly, a time length where the light emitting device is turned on in the skip frame may be substantially equal to a time length where the light emitting device is turned on in the refresh frame.

In each of the refresh frame and the skip frame, while the anode reset operation is being performed, an on-bias stress (OBS) may be performed on the driving transistor. The OBS operation may be used for different purposes in the hybrid-type pixel circuit and the LTPS-type pixel circuit.

In the hybrid-type pixel circuit, the OBS operation may be for preventing or at least reducing an image quality defect caused by a hysteresis characteristic of the driving transistor. When a grayscale value of the image data DATA is changed from black to white, a grayscale response time may increase in a first frame where a white image is reproduced, due to a time needed for varying the hysteresis characteristic of the driving transistor, and thus, a dim first frame (DFF) phenomenon may occur. The OBS operation may apply an OBS voltage to one electrode of the driving transistor to increase the Vgs of the driving transistor, and thus, may reduce a DFF characteristic. In the hybrid-type pixel circuit, the OBS voltage may be controlled for reducing a hysteresis characteristic difference between the refresh frame and the skip frame.

On the other hand, in the LTPS-type pixel circuit according to the present embodiment, the OBS operation may be for improving a luminance difference caused by a leakage characteristic variation of a pixel between the refresh frame and the skip frame. In the LTPS-type pixel circuit, the OBS operation may differentially control the OBS voltage so that a hysteresis characteristic difference occurs between the refresh frame and the skip frame arbitrarily, so as to improve a luminance difference between the refresh frame and the skip frame.

Touch sensors may be disposed on the display panel 100. The touch sensors may be arranged as an on-cell or add-on type on the screen AA of the display panel 100 or may be implemented as in-cell type touch sensors embedded in the pixel array. A touch input may be sensed through only the pixels SP even without the touch sensors, and in this case, the touch sensors may be omitted.

A display panel driver may include a source driver 110 and gate drivers 120L and 120R. The display panel driver may write the image data DATA in the pixels SP of the display panel 100, based on control by a timing controller 130.

A source driver 110 may convert the image data DATA, received from the timing controller 130, into gamma compensation voltages by using a digital-to-analog converter (DAC) to generate data voltages. The source driver 110 may supply the data voltages to the data lines DL. The data voltages may be supplied to the data lines DL and may be applied to gate electrodes of the driving transistors through the switch transistors of the subpixels SP. The source driver 110 may be implemented with a plurality of source drive integrated circuits (ICs).

The gate drivers 120L and 120R may be provided in a bezel region BZ which is outside the screen and does not display an image on the display panel 100. The gate drivers 120L and 120R may sequentially supply a gate signal to the gate lines GL, based on control by the timing controller 130. The gate signal may select pixel lines L1 to Ln where data voltages are charged and may simultaneously activate pixels SP disposed in the pixel lines L1 to Ln. The gate drivers 120L and 120R may output the gate signal by using a plurality of stages and may shift the gate signal. The gate signal may swing between an on level and an off level.

The timing controller 130 may receive video data DATA and a timing signal, synchronized with the video data DATA, from a host system (not shown). The timing signal may include a vertical synchronization signal Vsync, a horizontal synchronization signal Hsync, a clock signal DCLK, and a data enable signal DE. The vertical synchronization signal Vsync may define a vertical period. The horizontal synchronization signal Hsync may define a horizontal period. The data enable signal DE may define a time where the video data DATA is transferred, in a vertical period or a horizontal period. The vertical period and the horizontal period may be determined by a method of counting the data enable signal DE, and thus, the vertical synchronization signal Vsync and the horizontal synchronization signal Hsync may be omitted.

The timing controller 130 may generate a source timing control signal DDC for controlling an operation timing of the source driver 110 and a gate timing control signal GDC for controlling an operation timing of the gate drivers 120L and 120R, based on the timing signal Vsync, Hsync, and DE received from the host system.

The host system may be one of a television (TV), a set-top box, a navigation system, a personal computer (PC), a home theater, an automotive display system, a mobile device, and a wearable device. In the mobile device and the wearable device, the source driver 110, the timing controller 130, and level shifters 140L and 140R may be integrated into one drive IC.

To reduce a resistor-capacitor (RC) delay deviation occurring in the display panel 100 including a large screen, the gate drivers 120L and 120R may be implemented as a double bank type, and thus, gate signals having the same phase may be supplied from both sides of the display panel 100 to the same gate line GL. The gate drivers 120L and 120R may include a first-side gate driver 120L which is disposed in a left bezel region BZ of the display panel 100 and a second-side gate driver 120R which is disposed in a right bezel region BZ of the display panel 100.

The level shifters 140L and 140R may convert a voltage of the gate timing control signal GDC, output from the timing controller 130, into an on-level voltage and an off-level voltage and may supply the on-level voltage and the off-level voltage to the gate drivers 120L and 120R.

The level shifters 140L and 140R may a first level shifter 140L which is connected to the first-side gate driver 120L through first signal lines and a second level shifter 140R which is connected to the second-side gate driver 120R through second signal lines.

Figure 2:
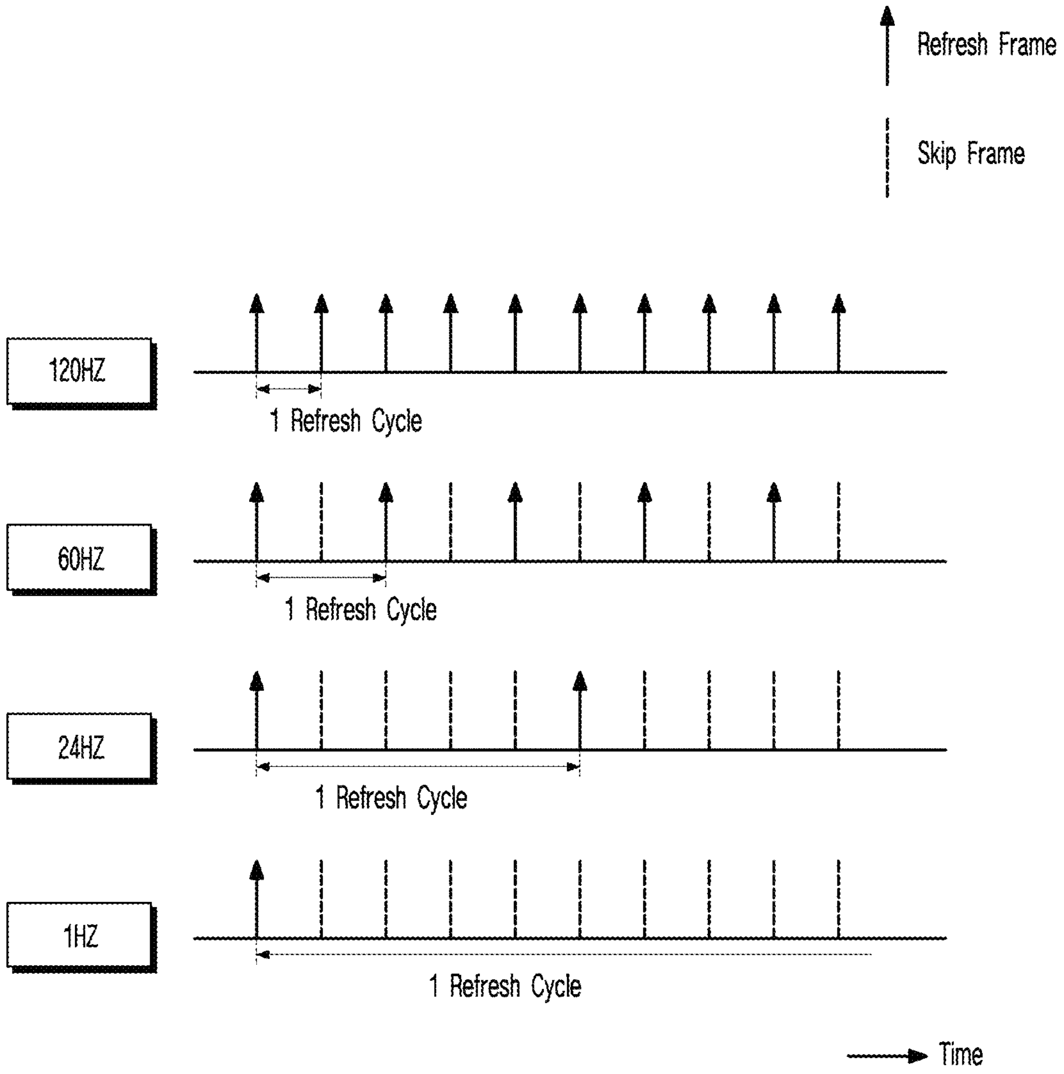
FIG. 2 is a diagram illustrating an example of refresh rate variable technology applied to a display apparatus according to an embodiment of the present disclosure.

FIG. 2 is a diagram illustrating an example of refresh rate variable technology applied to a display apparatus according to an embodiment of the present disclosure.

Referring to FIG. 2, a data refresh cycle implemented in pixels of a display panel may vary based on an attribute of an input image. The data refresh cycle may decrease when the amount of variation of an image is large, and when the amount of variation of the image is small, the data refresh cycle may increase. As the data refresh cycle increases, low-speed driving may be performed, and as the data refresh cycle decreases, high-speed driving may be performed.

The data refresh cycle may be 1/frame frequency. For example, the data refresh cycle may be 1 sec/120 in 120 Hz, 1 sec/60 in 60 Hz, 1 sec/24 in 24 Hz, and 1 sec in 1 Hz.

The number of skip frames provided between two adjacent refresh frames may vary based on a frame frequency. For example, the number of skip frames may be 0 in 120 Hz, 1 in 60 Hz, 4 in 24 Hz, and 119 in 1 Hz.

Figure 3:
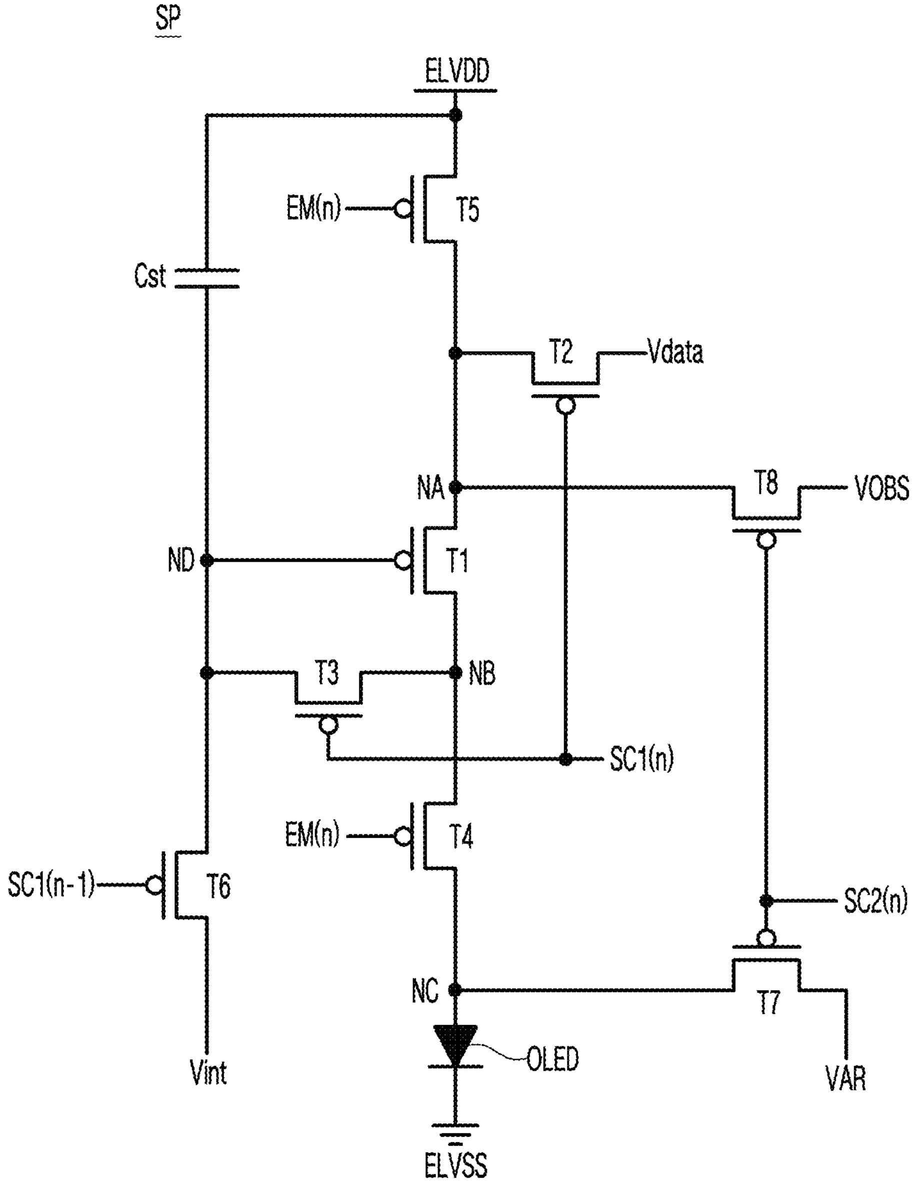
FIG. 3 is a diagram illustrating a pixel according to an embodiment of the present disclosure.

FIG. 3 is a diagram illustrating a pixel SP disposed in an $n^{th}$ pixel line Ln according to an embodiment of the present disclosure.

Referring to FIG. 3, the pixel SP disposed in the $n^{th}$ pixel line Ln may be implemented with a pixel circuit which includes a light emitting device OLED, a driving transistor T1, switch transistors T2 to T8, and a capacitor Cst.

The transistors T1 to T8 and the capacitor Cst may control a driving current Ioled flowing in the light emitting device OLED to drive the light emitting device OLED. Each of the transistors T1 to T8 may include a first electrode, a second electrode, and a gate electrode. One of the first electrode and the second electrode may be a source electrode, and the other of the first electrode and the second electrode may be a drain electrode.

Each of the transistors T1 to T8 may be implemented as a PMOS transistor including a semiconductor layer having LTPS. Accordingly, an on-level voltage of each of the transistors T1 to T8 may be a low voltage, and an off-level voltage thereof may be a high voltage.

The light emitting device OLED may include an anode electrode (or a pixel electrode), a cathode electrode (or a common electrode), and an organic compound layer (configured with a common layer and an emission layer) disposed therebetween. The anode electrode of the light emitting device OLED may be connected to a third node NC, and the cathode electrode of the light emitting device OLED may be connected to a second source voltage ELVSS.

The driving transistor T1 may include a first electrode connected to the first node NA, a second electrode connected to a second node NB, and a gate electrode connected to a fourth node ND. The driving transistor T1 may generate the driving current Ioled based on a voltage of the fourth node ND (or a data voltage stored in the capacitor Cst) and may apply the driving current Ioled to the light emitting device OLED.

The switch transistor T2 may include a first electrode (or receiving a data voltage Vdata) connected to a data line, a second electrode connected to the first node NA, and a gate electrode which receives a first scan signal SC1(*n*). The switch transistor T1 may be turned on in response to the first scan signal SC1(*n*) and may transfer the data voltage Vdata to the first node NA.

The switch transistor T3 may include a first electrode connected to the fourth node ND, a second electrode connected to the second node NB, and a gate electrode which receives the first scan signal SC1(*n*). The switch transistor T3 may be turned on in response to the first scan signal SC1(*n*) and may short-circuit the gate electrode and the second electrode of the driving transistor T1. Accordingly, the driving transistor T1 may operate like a diode while the switch transistor T3 is being turned on.

The capacitor Cst may be connected between the fourth node ND and an input terminal of the first source voltage ELVDD. The capacitor Cst may hold a voltage of the fourth node ND.

The switch transistors T4 and T5 may be connected between the first source voltage ELVDD and the light emitting diode OLED and may form a current movement path through which the driving current Ioled generated by the driving transistor T1 moves.

The switch transistor T4 may include a first electrode connected to the second node NB, a second electrode connected to the third node NC, and a gate electrode which receives an emission control signal EM(n). The switch transistor T5 may include a first electrode connected to an input terminal of the first source voltage ELVDD, a second electrode connected to the first node NA, and a gate electrode which receives the emission control signal EM(n).

The switch transistors T4 and T5 may be turned on in response to the emission control signal EM(n). While the switch transistors T4 and T5 are being turned on, the light emitting device OLED may emit light with brightness corresponding to the driving current Ioled.

The switch transistor T6 may include a first electrode connected to an input terminal of an initialization voltage Vint, a second electrode connected to the fourth node ND, and a gate electrode which receives a front-end scan signal SC1(*n*−1). The switch transistor T6 may be turned on in response to the front-end scan signal SC1(*n*−1) and may apply the initialization voltage Vint to the fourth node ND.

The switch transistor T7 may include a first electrode connected to an input terminal of an anode reset voltage VAR, a second electrode connected to the third node NC, and a gate electrode which receives a second scan signal SC2(*n*). The switch transistor T7 may be turned on in response to the second scan signal SC2(*n*) and may transfer the anode reset voltage VAR to the third node NC.

The switch transistor T8 may include a first electrode connected to an input terminal of an OBS voltage VOBS, a second electrode connected to the first node NA, and a gate electrode which receives the second scan signal SC2(*n*). The switch transistor T8 may be turned on in response to the second scan signal SC2(*n*) and may transfer the OBS voltage VOBS to the first node NA.

Figure 4:
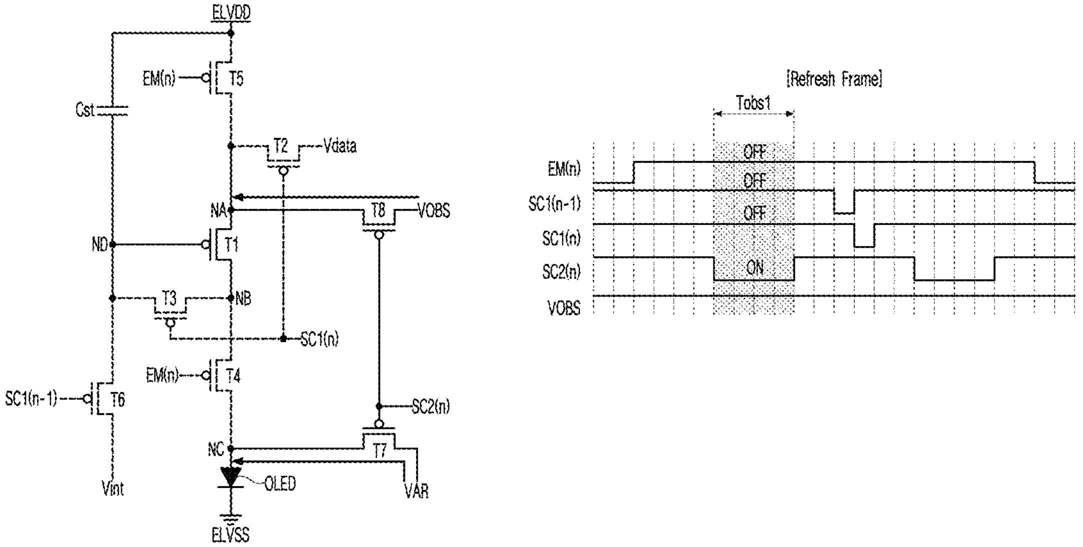
FIG. 4 is a diagram for describing an operation of a pixel on a first on-bias stress (OBS) period of a refresh frame according to an embodiment of the present disclosure.

FIG. 4 is a diagram for describing an operation of a pixel on a first OBS period of a refresh frame according to one embodiment.

Referring to FIG. 4, in a first OBS period Tobs1 of a refresh frame, the switch transistors T7 and T8 may be turned on in response to the second scan signal SC2(*n*), and the other switch transistors T2 to T6 may be turned off.

In the first OBS period Tobs1 of the refresh frame, as the switch transistor T8 is turned on, the OBS voltage VOBS may be applied to the first node NA. Based on the OBS voltage VOBS, a drain-source channel of the driving transistor T1 may be maximally opened, and the driving transistor T1 may maintain a stronger saturation state.

At this time, a gate-source voltage of the driving transistor T1 (i.e., Vgs=Vdata(n−1)−|Vth|−VOBS) may be applied. Vdata(n−1) may be a data voltage previously charged in the fourth node ND, and Vth may be a threshold voltage of the driving transistor T1. Accordingly, a hysteresis characteristic of the driving transistor T1 may be mitigated.

In the first OBS period Tobs1 of the refresh frame, as the switch transistor T7 is turned on, the anode reset voltage VAR may be applied to the third node NC. Based on the anode reset voltage VAR, residual electric charges charged in a parasitic capacitor formed between an anode electrode and a cathode electrode of a light emitting device may be reset.

Figure 5:
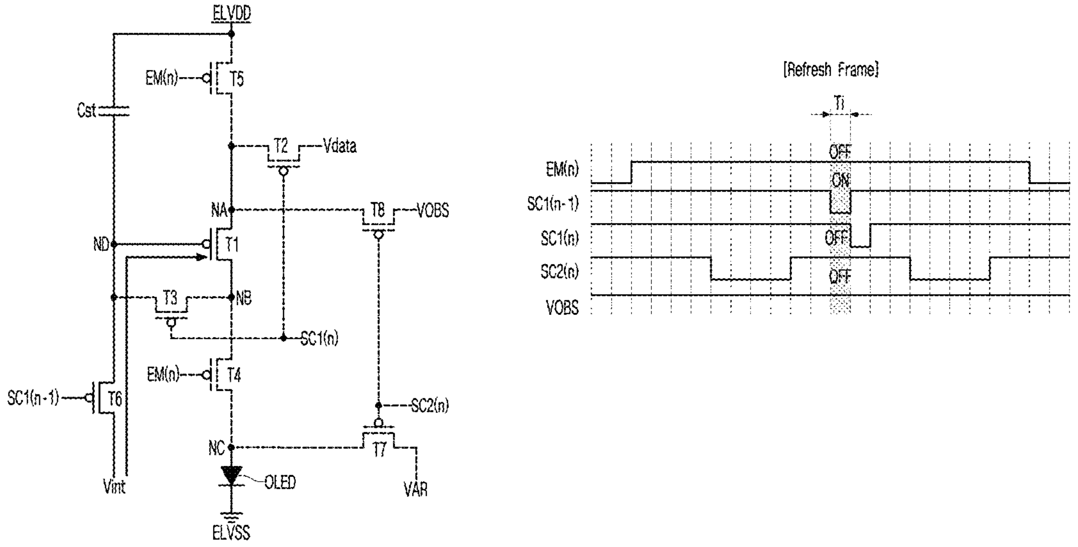
FIG. 5 is a diagram for describing an operation of a pixel on an initialization period of a refresh frame according to an embodiment of the present disclosure.

FIG. 5 is a diagram for describing an operation of a pixel on an initialization period of a refresh frame according to one embodiment.

Referring to FIG. 5, in an initialization period Ti of a refresh frame, the switch transistor T6 may be turned on in response to the front-end scan signal SC1(*n*−1), and the other switch transistors T2 to T5, T7, and T8 may be turned off.

In the initialization period Ti of the refresh frame, as the switch transistor T6 is turned on, the fourth node ND may be initialized into the initialization voltage Vint.

Figure 6:
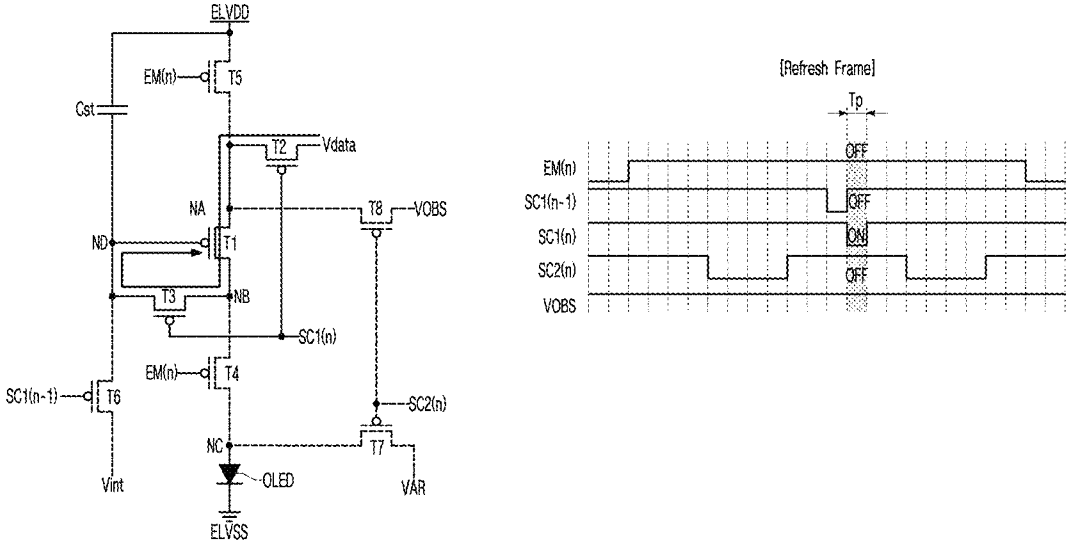
FIG. 6 is a diagram for describing an operation of a pixel on a programming period of a refresh frame according to an embodiment of the present disclosure.

FIG. 6 is a diagram for describing an operation of a pixel on a programming period of a refresh frame according to one embodiment.

Referring to FIG. 6, in a programming period Tp of a refresh frame, the switch transistors T2 and T3 may be turned on in response to the first scan signal SC1(*n*), and the other switch transistors T4 to T8 may be turned off.

In the programming period Tp of the refresh frame, as the switch transistors T2 and T3 are turned on, a threshold voltage sampling operation and a data programming operation may be sequentially or simultaneously performed.

A data voltage Vdata(n) may be applied to the first node NA through the switch transistor T2. The data voltage Vdata(n) may be applied to the second node NB through the driving transistor T1, and subsequently, may be applied to the fourth node ND through the switch transistor T3. The driving transistor T1 may operate like a diode in a state where the switch transistor T3 is turned on, and thus, an electric potential at the gate electrode of the driving transistor T1 connected to the fourth node ND may be programmed as "Vdata(n)−|Vth|". A threshold voltage Vth may be sampled and may be reflected in the electric potential at the gate electrode of the programmed driving transistor T1.

Figure 7:
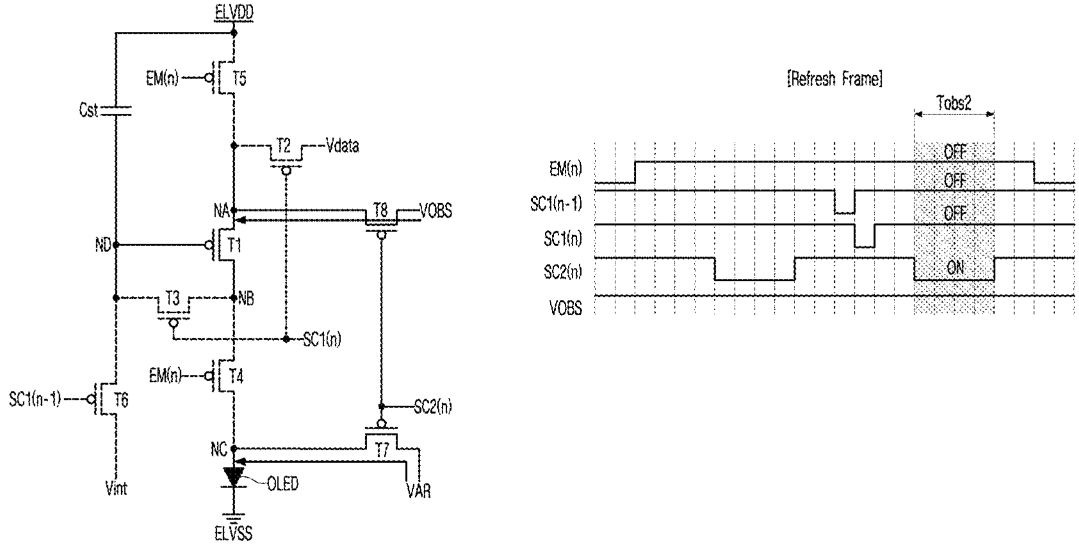
FIG. 7 is a diagram for describing an operation of a pixel on a second OBS period of a refresh frame according to an embodiment of the present disclosure.

FIG. 7 is a diagram for describing an operation of a pixel on a second OBS period of a refresh frame according to one embodiment.

Referring to FIG. 7, in a second OBS period Tobs2 of the refresh frame, the switch transistors T7 and T8 may be turned on in response to the second scan signal SC2(*n*), and the other switch transistors T2 to T6 may be turned off.

An operation of the second OBS period Tobs2 of the refresh frame may be substantially the same as that of the first OBS period Tobs1 of the refresh frame described above with reference to FIG. 4, and thus, may be omitted.

The first OBS period Tobs1 of the refresh frame and the second OBS period Tobs2 of the refresh frame may be respectively disposed at a pre-timing and a post-timing of the programming period T. In this manner, when OBS compensation is performed once more at the post-timing subsequent to the pre-timing of the programming period Tp, an improvement effect of a DFF characteristic may be more enhanced.

Figure 8:
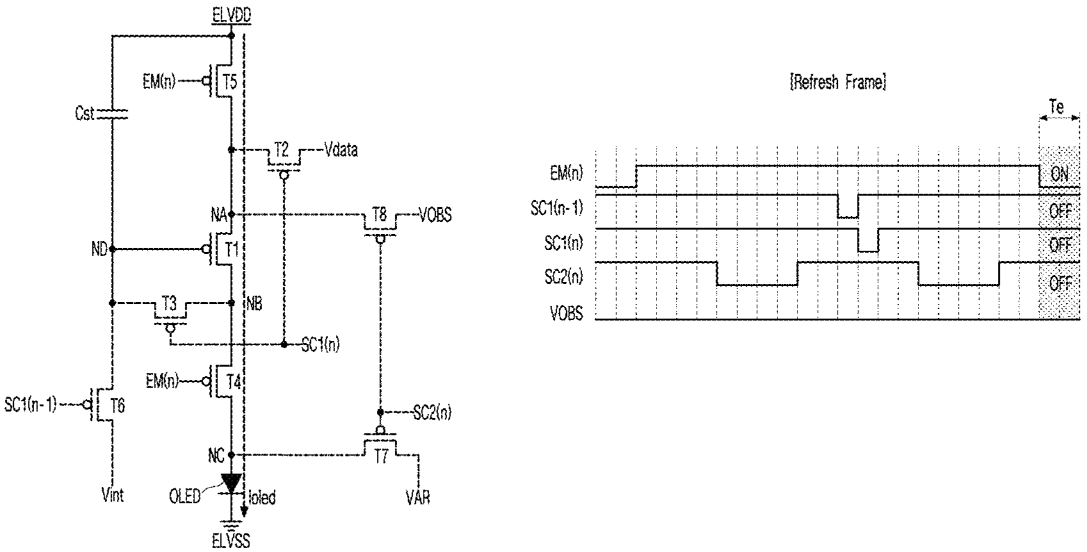
FIG. 8 is a diagram for describing an operation of a pixel on an emission period of a refresh frame according to an embodiment of the present disclosure.

FIG. 8 is a diagram for describing an operation of a pixel on an emission period of a refresh frame according to one embodiment.

Referring to FIG. 8, in an emission period Te of the refresh frame, the switch transistors T4 and T5 may be turned on in response to the emission control signal EM(n), and the other switch transistors T2, T3, and T6 to T8 may be turned off.

In the emission period Te of the refresh frame, the driving current Ioled supplied from the driving transistor T1 to the light emitting device OLED may be based on Vgs of the driving transistor T1 which is set in the programming period Tp. The driving current Ioled may be irrelevant to a threshold voltage Vth of the driving transistor T and may be associated with the data voltage Vdata(n).

Figure 9:
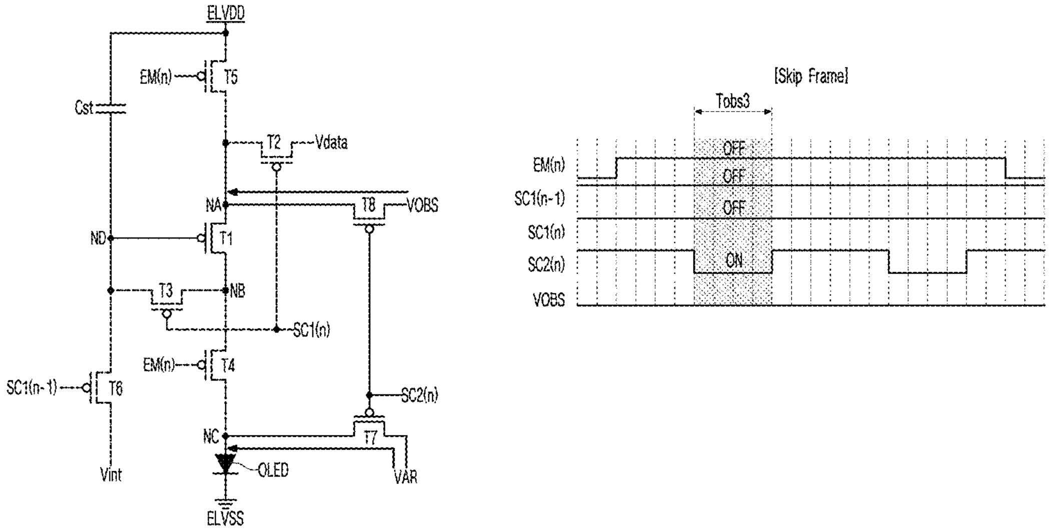
FIG. 9 is a diagram for describing an operation of a pixel on a third OBS period of a skip frame according to an embodiment of the present disclosure.

FIG. 9 is a diagram for describing an operation of a pixel on a third OBS period of a skip frame according to one embodiment. Also, FIG. 10 is a diagram for describing an operation of a pixel on a fourth OBS period of a skip frame according to one embodiment.

Figure 10:
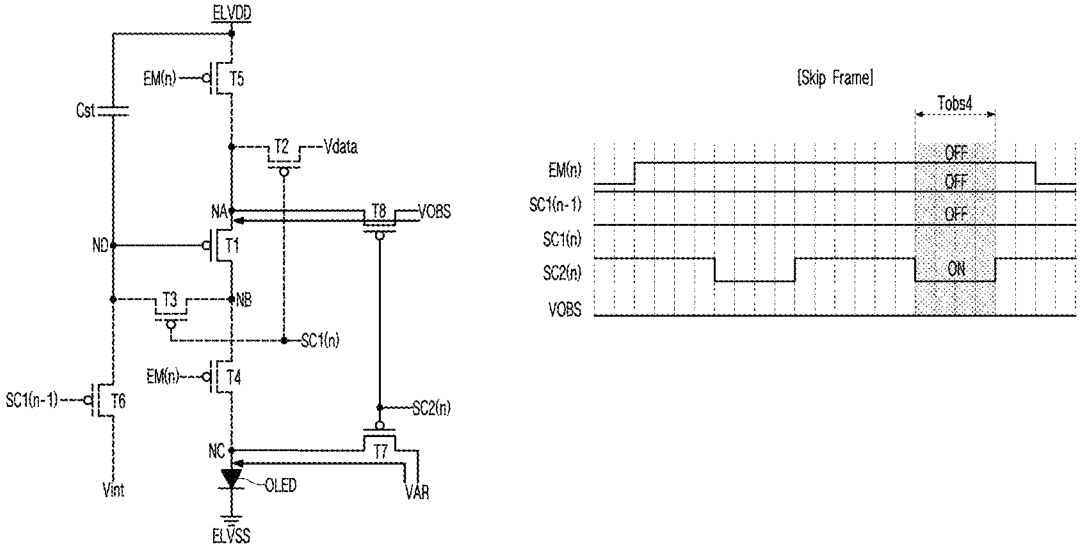
FIG. 10 is a diagram for describing an operation of a pixel on a fourth OBS period of a skip frame according to an embodiment of the present disclosure.

Referring to FIGS. 9 and 10, in third and fourth OBS periods Tobs3 and Tobs4 of the skip frame, the switch transistors T7 and T8 may be turned on in response to the second scan signal SC2(*n*), and the other switch transistors T2 to T6 may be turned off.

Operations of the third and fourth OBS periods Tobs3 and Tobs4 of the skip frame may be substantially the same as those of the first and second OBS periods Tobs1 and Tobs2 of the refresh frame, and thus, may be omitted.

The first and second OBS periods Tobs1 and Tobs2 of the refresh frame may be included in an off voltage period of the emission control signal EM(n), and moreover, the third and fourth OBS periods Tobs3 and Tobs4 of the skip frame may be included in the off voltage period of the emission control signal EM(n).

A length of the off voltage period of the emission control signal EM(n) may be equal to each other in the refresh frame and the skip frame, and thus, a length of an emission maintenance time may be equal to each other in the refresh frame and the skip frame.

Figure 11:
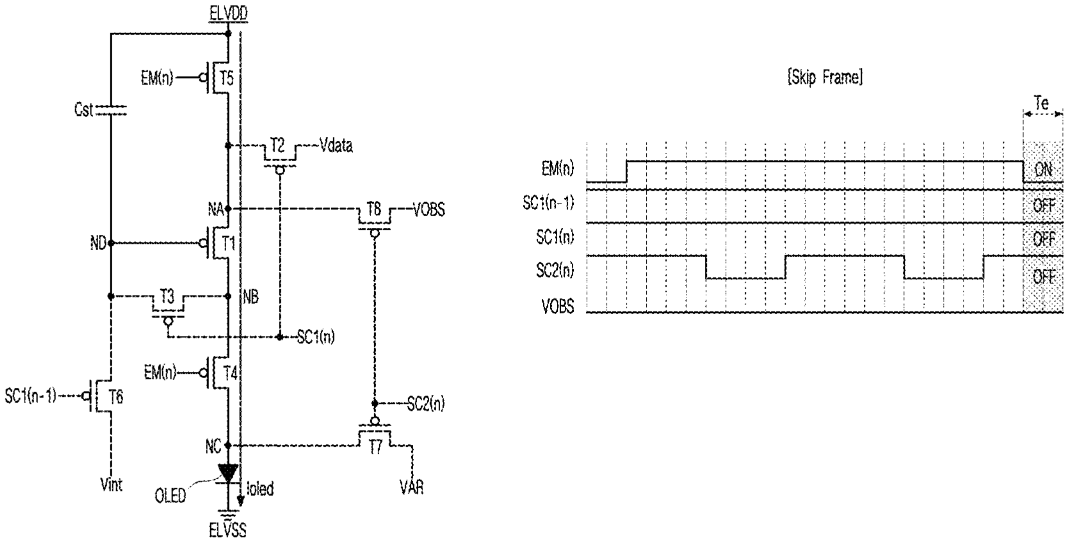
FIG. 11 is a diagram for describing an operation of a pixel on an emission period of a skip frame according to an embodiment of the present disclosure.

FIG. 11 is a diagram for describing an operation of a pixel on an emission period of a skip frame according to one embodiment.

Referring to FIG. 11, in an emission period Te of the skip frame, the switch transistors T4 and T5 may be turned on in response to the emission control signal EM(n), and the other switch transistors T2, T3, and T6 to T8 may be turned off.

In the emission period Te of the skip frame, the driving current Ioled supplied from the driving transistor T1 to the light emitting device OLED may have the same magnitude as that of the driving current Ioled in the emission period Te of the refresh frame.

FIGS. 12A, 12B, 13A, and 13B are diagrams illustrating an example where a luminance deviation occurring between a refresh frame and a skip frame is greater in a high gray level than a low gray level according to one embodiment.

Referring to FIGS. 12A, 12B, 13A, and 13B, due to a leakage characteristic variation occurring in LTPS-based pixels, a luminance deviation ΔL1 or ΔL2 may occur between a refresh frame and a skip frame. A factor causing the leakage characteristic variation may include a leakage current occurring in the LTPS-based pixels or a coupling effect occurring in the LTPS-based pixels.

Such a luminance deviation may increase as a data refresh cycle increases, the number of skip frames increases, and a frame frequency is lowered. This may be caused by that data holding capability is not good in the skip frame, in the LTPS-based pixels.

The luminance deviation ΔL1 or ΔL2 between the refresh frame and the skip frame may vary based on a design layout of a pixel.

When an electric potential at a gate electrode of a driving transistor increases more in the skip frame than the refresh frame due to a leakage current or coupling (for example, when a leakage current/coupling occurs between a gate electrode of the driving transistor and an input terminal of ELVDD), a luminance of the skip frame may be ΔL1 lower than a luminance of the refresh frame as in FIG. 12B.

When an electric potential at the gate electrode of the driving transistor decreases more in the skip frame than the refresh frame due to a leakage current or coupling (for example, when a leakage current/coupling occurs between the gate electrode of the driving transistor and an input terminal of Vint), a luminance of the skip frame may be ΔL2 higher than a luminance of the refresh frame as in FIG. 13B.

The luminance deviation ΔL1 or ΔL2 may considerably appear in a high grayscale period near a white gray level. However, the luminance deviation ΔL1 or ΔL2 between the refresh frame and the skip frame may not be recognized in a low grayscale period near a black-gray level.

Accordingly, a method which may compensate for a luminance deviation of the high grayscale period without affecting the low grayscale period may be needed.

Figure 14:
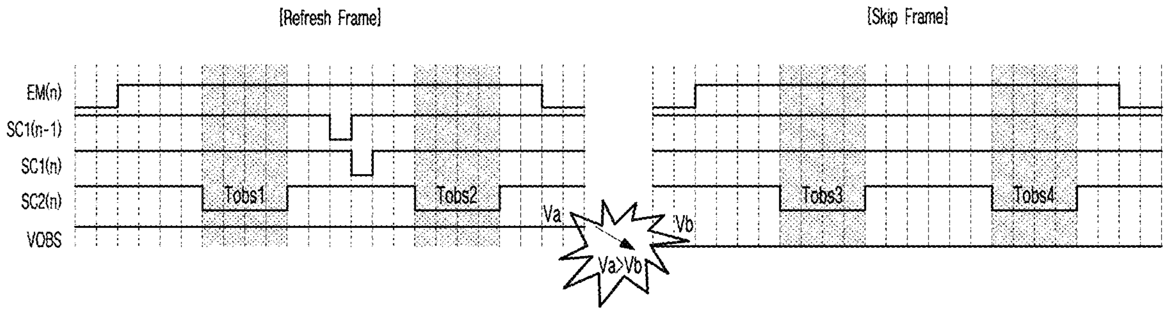
FIGS. 14 and 15 are diagrams illustrating an example where an OBS voltage applied to pixels in a refresh frame and an OBS voltage applied to pixels in a skip frame are differently set according to an embodiment of the present disclosure.
Figure 15:
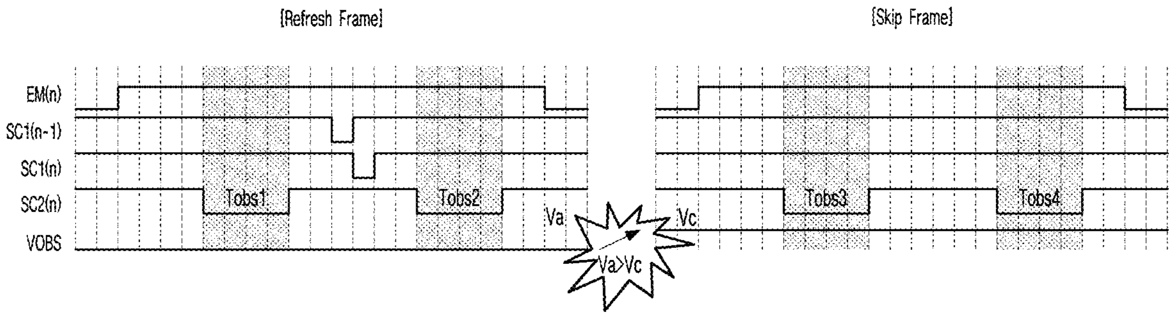

FIGS. 14 and 15 are diagrams illustrating an example where an OBS voltage applied to pixels in a refresh frame and an OBS voltage applied to pixels in a skip frame are differently set according to one embodiment.

The present embodiment may differentially apply an OBS voltage of a refresh frame and an OBS voltage of a skip frame to arbitrarily cause a threshold voltage Vth difference of a driving transistor, and thus, may compensate for a luminance deviation between the refresh frame and the skip frame.

Based on a case where a luminance of a skip frame is ALI lower than a luminance of a refresh frame as in FIG. 12, the present embodiment may be set so that an OBS voltage Vb of the skip frame is less than an OBS voltage Va of the refresh frame as in FIG. 14, and thus, may increase the luminance of the skip frame so that an absolute value of Vth is reduced in a driving current equation "$Ioled=(Vgs-Vth)^2$". As a result, a luminance deviation equal to ΔL1 may be compensated for.

Based on a case where a luminance of a skip frame is ΔL1 higher than a luminance of a refresh frame as in FIG. 13, the present embodiment may be set so that an OBS voltage Vc of the skip frame is greater than an OBS voltage Va of the refresh frame as in FIG. 15, and thus, may decrease the luminance of the skip frame so that an absolute value of Vth increases in a driving current equation "$Ioled=(Vgs-Vth)^2$". As a result, a luminance deviation equal to ΔL2 may be compensated for.

As described above, when the OBS voltage of the refresh frame and the OBS voltage of the skip frame are differentially applied, a luminance deviation of a high grayscale period may be effectively compensated for without affecting a low grayscale period.

Figure 16:
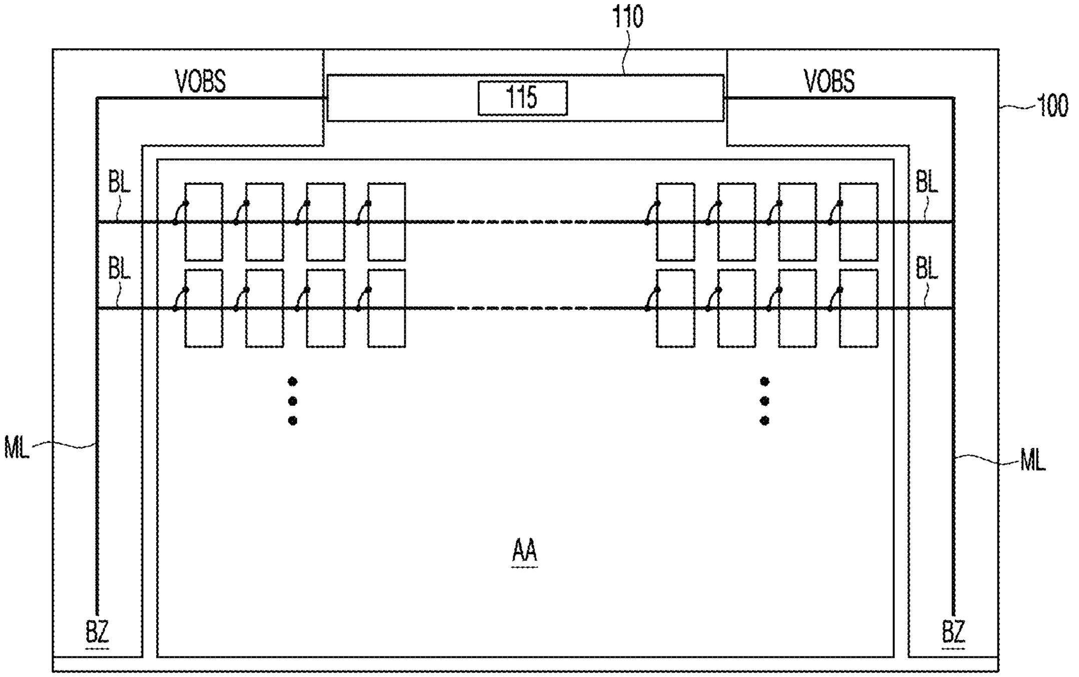
FIG. 16 is a diagram illustrating a connection configuration between an OBS controller and pixels according to an embodiment of the present disclosure.

FIG. 16 is a diagram illustrating a connection configuration between an OBS controller and pixels according to one embodiment.

Referring to FIG. 16, a display apparatus according to the present embodiment may further include a bias controller 115 which may differentially apply an OBS voltage VOBS, in a refresh frame and a skip frame.

The bias controller 115 may be equipped in a source driver 110, but is not limited thereto. The bias controller 115 may be mounted on a printed circuit board (PCB) independently of the source driver 110.

The bias controller 115 may output an OBS voltage VOBS of a first level to an OBS supply line in the refresh frame and may output an OBS voltage VOBS of a second level, differing from the first level, to the OBS supply line in the skip frame.

The OBS supply line may include a main line ML and a branch line BL. The main line ML may be disposed in a bezel region BZ of the display panel 100. The branch line BL may branch from the main line ML and may be connected to pixels SP of a screen AA. The branch line BL may be arranged in parallel with gate lines.

The OBS voltage VOBS output from the bias controller 115 may be supplied to the pixels SP through the main line ML and the branch line BL.

Figure 17:
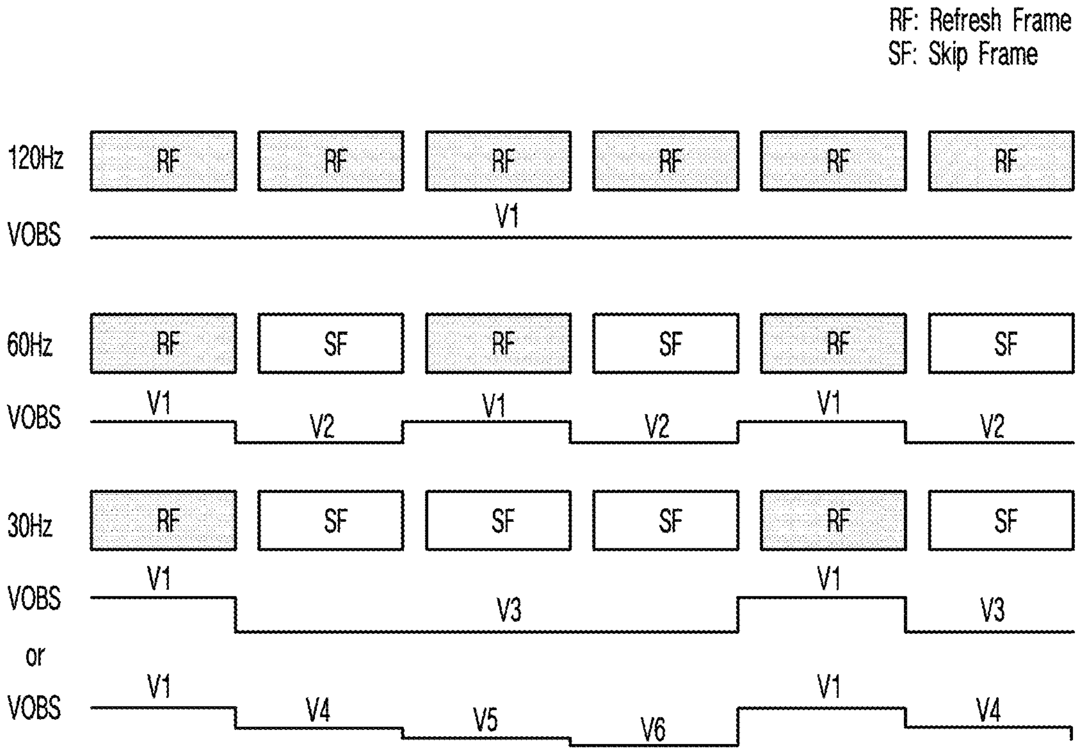
FIGS. 17 and 18 are diagrams illustrating an example where a difference between OBS voltages applied to pixels in a refresh frame and a skip frame varies based on a frame frequency according to an embodiment of the present disclosure.
Figure 18:
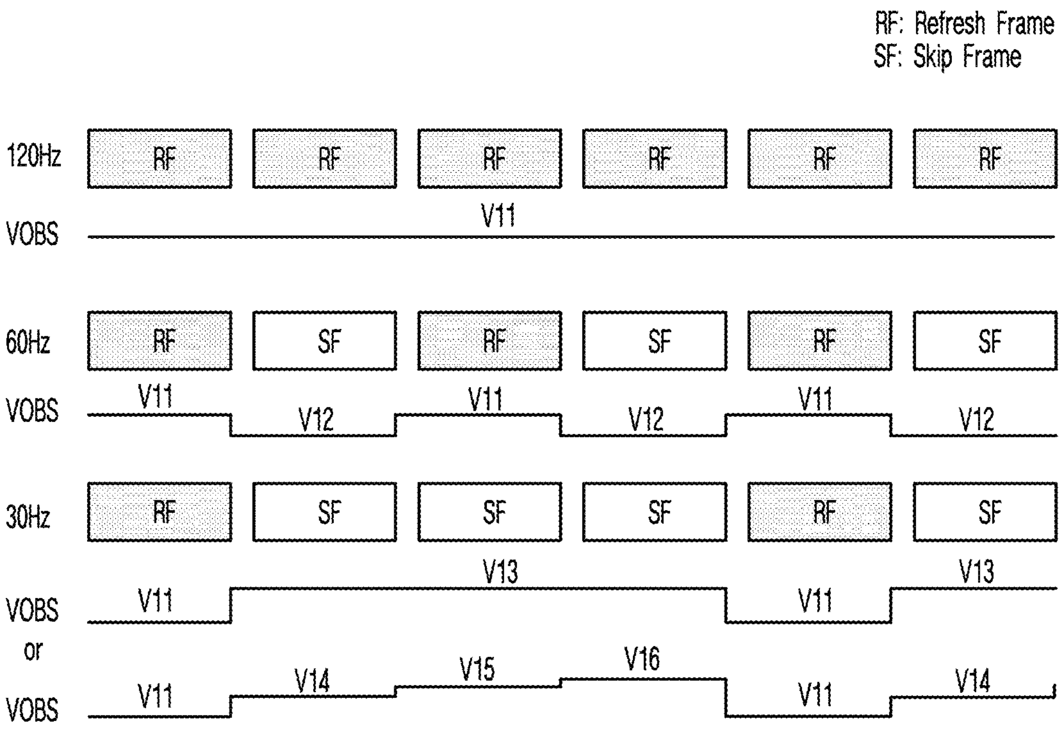

FIGS. 17 and 18 are diagrams illustrating an example where a difference between OBS voltages applied to pixels in a refresh frame and a skip frame varies based on a frame frequency according to one embodiment.

The number (i.e., a holding time) of skip frames where luminance varies may be changed based on a frame frequency, and thus, a voltage difference which is to be compensated for with Vth may vary. Accordingly, an OBS voltage difference between the refresh frame and the skip frame should be differently set based on a frame frequency.

As in FIG. 17, as a frame frequency is reduced, an OBS voltage difference between the refresh frame and the skip frame may increase. An OBS voltage VOBS of the refresh frame may be fixed to V1 regardless of the frame frequency, and as the frame frequency is lowered, an OBS voltage VOBS of the skip frame may be downward controlled within a voltage range which is lower than V1.

In detail, in 120 Hz consisting of only a refresh frequency RF, an OBS voltage VOBS may be V1. In 60 Hz where one skip frame SF is provided between adjacent refresh frames RF, the OBS voltage VOBS of the skip frame may be V2 which is lower than V1. In 30 Hz where three skip frames SF are provided between adjacent refresh frames RF, the OBS voltage VOBS of the skip frame may be V3 which is lower than V2. In 30 Hz, OBS voltages VOBS of skip frames may be lowered step-by-step within a voltage range which is lower than V1. In this case, OBS voltages VOBS between three skip frames SF may be V4, V5, and V6 and may differ.

As in FIG. 18, as a frame frequency is lowered, an OBS voltage difference between a refresh frame and a skip frame may increase. An OBS voltage VOBS of the refresh frame may be fixed to V11 regardless of the frame frequency, and as the frame frequency is lowered, an OBS voltage VOBS of the skip frame may be upward controlled within a voltage range which is higher than V11.

In detail, in 120 Hz having only a refresh frequency RF, an OBS voltage VOBS may be V11. In 60 Hz where one skip frame SF is provided between adjacent refresh frames RF, the OBS voltage VOBS of the skip frame may be V12 which is higher than V11. In 30 Hz where three skip frames SF are provided between adjacent refresh frames RF, the OBS voltage VOBS of the skip frame may be V13 which is higher than V12. In 30 Hz, OBS voltages VOBS of skip frames may increase step-by-step within a voltage range which is higher than V11. In this case, OBS voltages VOBS between three skip frames SF may be V14, V15, and V16 and may differ.

Figure 19:
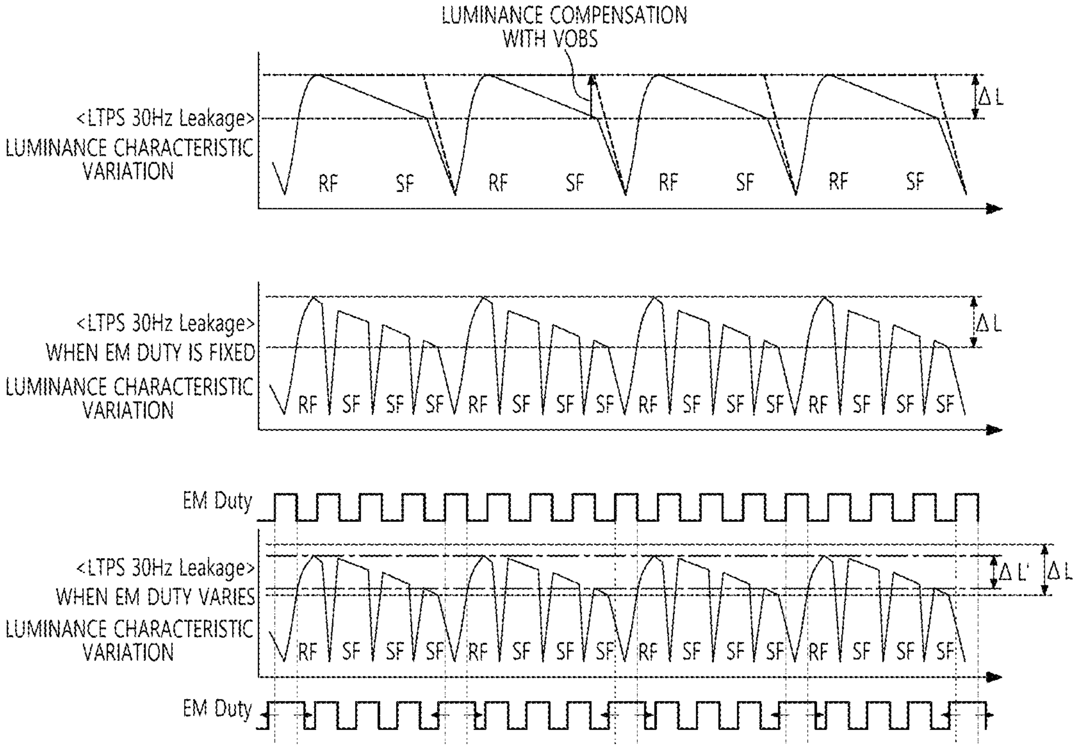
FIG. 19 is a diagram illustrating EM duty control technology for more decreasing a luminance deviation between a refresh frame and a skip frame according to an embodiment of the present disclosure.

FIG. 19 is a diagram illustrating EM duty control technology for more decreasing a luminance deviation between a refresh frame and a skip frame according to one embodiment.

Referring to FIG. 19, a gate driver according to the present embodiment may supply a pixel with an emission control signal EM based on pulse width modulation (PWM) for controlling an on and off timing of a light emitting device included in the pixel.

As described above, in a low-speed driving condition (for example, 30 Hz) where a skip frame SF is provided, a luminance deviation ΔL may occur between a refresh frame RF and the skip frame SF. At this time, when an off duty cycle of the emission control signal EM is differentially controlled without being intactly controlled, the luminance deviation ΔL may be reduced. When the luminance deviation ΔL between the refresh frame RF and the skip frame SF is reduced, a control range of an OBS voltage VOBS for compensating for the luminance deviation may be reduced, and thus, power consumption may be reduced.

Figure 20:
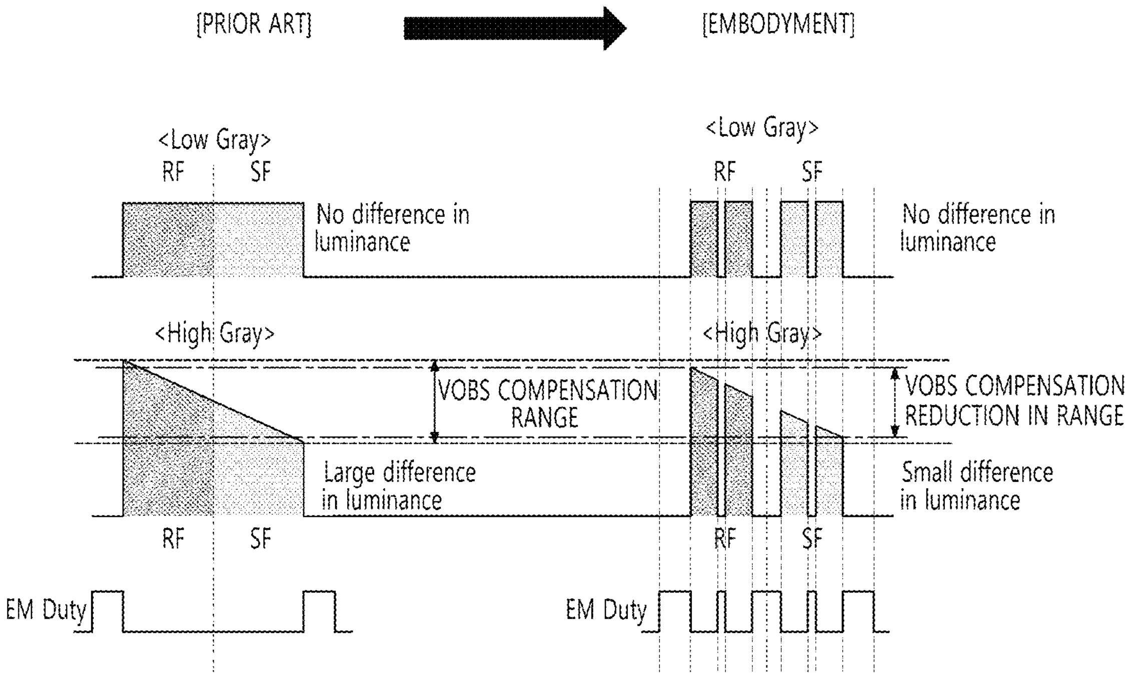
FIGS. 20 and 21 are diagrams illustrating an example where a control range of an OBS voltage is reduced by the EM duty control technology according to an embodiment of the present disclosure.
Figure 21:
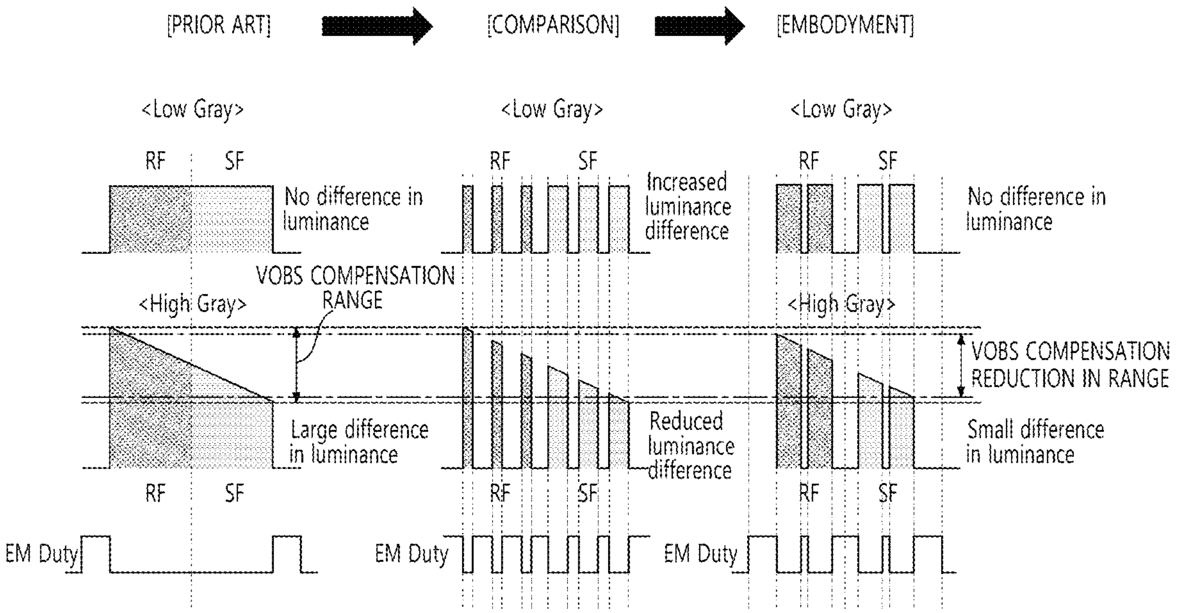

FIGS. 20 and 21 are diagrams illustrating an example where a control range of an OBS voltage is reduced by the EM duty control technology according to one embodiment.

Referring to FIGS. 20 and 21, in a comparative example, in order to decrease a luminance deviation between a refresh frame RF and a skip frame SF, an on duty cycle may increase more in the skip frame SF than the refresh frame RF. In this case, however, a side effect may occur where a luminance deviation of a high grayscale period decreases, but a luminance deviation of a low grayscale period increases.

In the present embodiment, an on duty cycle of an emission control signal EM may be equal to each other in the refresh frame RF and the skip frame SF, and thus, a luminance deviation may not be removed in the low grayscale period.

Moreover, the present embodiment may dualize and differentially arrange an off duty cycle of the emission control signal EM in the refresh frame RF and the skip frame SF and may thus reduce a luminance deviation of the high grayscale period.

The off duty cycle of the emission control signal EM according to the present embodiment may include a first off duty cycle and a second off duty cycle which is longer than the first off duty cycle.

The first off duty cycle may be disposed between on duty cycles of the refresh frame RF and on duty cycles of the skip frame SF. Also, the second off duty cycle may be disposed immediately before a first on duty cycle of the refresh frame RF, immediately after a last on duty cycle of the skip frame SF, and between a last on duty cycle of the refresh frame RF and a first on duty cycle of the skip frame SF.

When the first and second off duty cycles are arranged as described above, a difference between the maximum (Max) luminance of the refresh frame RF and the minimum (Min) luminance of the skip frame SF may be reduced.

The present disclosure may realize the following effects.

The present disclosure may differentially apply an OBS voltage in a refresh frame and a skip frame to decrease a luminance deviation caused by a leakage characteristic variation occurring between the refresh frame and the skip frame, and thus, may enhance display quality.

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:

a display panel including at least one pixel;

a source driver configured to output a data voltage, which is to be supplied to the at least one pixel, in a refresh frame and stop an output of the data voltage, which is to be supplied to the at least one pixel, in at least one skip frame succeeding the refresh frame; and a bias controller configured to output a first on-bias stress voltage, which is to be supplied to the at least one pixel, in the refresh frame and output a second on-bias stress voltage, which is to be supplied to the at least one pixel, in the at least one skip frame, wherein the first on-bias stress voltage and the second on-bias stress voltage are applied to one electrode of a driving transistor included in the at least one pixel so as to improve a luminance difference caused by a leakage characteristic variation of the at least one pixel, wherein the first on-bias stress voltage and the second on-bias stress voltage are differently set so that a threshold voltage characteristic of the driving transistor differs in the refresh frame and the at least one skip frame, and wherein a voltage difference between the first on-bias stress voltage and the second on-bias stress voltage is determined based on a number of skip frames succeeding the refresh frame.

2. The display apparatus of claim 1, wherein the voltage difference between the first on-bias stress voltage and the second on-bias stress voltage increases in proportion to the number of skip frames succeeding the refresh frame.

3. The display apparatus of claim 2, wherein, when the number of skip frames succeeding the refresh frame is in plurality, second on-bias stress voltages corresponding to a plurality of skip frames are equal to one another.

4. The display apparatus of claim 2, wherein, when the number of skip frames succeeding the refresh frame is in plurality, second on-bias stress voltages corresponding to a plurality of skip frames are different from each other.

5. The display apparatus of claim 1, wherein, when a luminance of the at least one skip frame is lower than a luminance of the refresh frame, the second on-bias stress voltage is lower than the first on-bias stress voltage.

6. The display apparatus of claim 1, wherein, when a luminance of the at least one skip frame is higher than a luminance of the refresh frame, the second on-bias stress voltage is higher than the first on-bias stress voltage.

7. The display apparatus of claim 1, further comprising:

a gate driver configured to supply the at least one pixel with an emission control signal based on pulse width modulation so as to control an on and off timing of a light emitting device included in the at least one pixel, wherein an off duty cycle of the emission control signal comprises a first off duty cycle and a second off duty cycle which is longer than the first off duty cycle.

8. The display apparatus of claim 7, wherein the first off duty cycle is provided between on duty cycles of the refresh frame and between on duty cycles of the at least one skip frame, and the second off duty cycle is provided immediately before a first on duty cycle of the refresh frame, immediately after a last on duty cycle of the at least one skip frame, and between a last on duty cycle of the refresh frame and a first on duty cycle of the at least one skip frame.

9. The display apparatus of claim 7, wherein an on duty cycle of the emission control signal has a same length in the refresh frame and the at least one skip frame.

10. A driving method of a display apparatus including a display panel including at least one pixel, the driving method comprising:

outputting a data voltage, which is to be supplied to the at least one pixel, in a refresh frame and stopping an output of the data voltage, which is to be supplied to the at least one pixel, in at least one skip frame succeeding the refresh frame; and outputting a first on-bias stress voltage, which is to be supplied to the at least one pixel, in the refresh frame and outputting a second on-bias stress voltage, which is to be supplied to the at least one pixel, in the at least one skip frame, wherein the first on-bias stress voltage and the second on-bias stress voltage are applied to one electrode of a driving transistor included in the at least one pixel so as to improve a luminance difference caused by a leakage characteristic variation of the at least one pixel, wherein the first on-bias stress voltage and the second on-bias stress voltage are differently set so that a threshold voltage characteristic of the driving transistor differs in the refresh frame and the at least one skip frame, and wherein a voltage difference between the first on-bias stress voltage and the second on-bias stress voltage is determined based on a number of skip frames succeeding the refresh frame.

11. The driving method of claim 10, wherein the voltage difference between the first on-bias stress voltage and the second on-bias stress voltage increases in proportion to the number of skip frames succeeding the refresh frame.

12. The driving method of claim 11, wherein, when the number of skip frames succeeding the refresh frame is in plurality, second on-bias stress voltages corresponding to a plurality of skip frames are equal to one another.

13. The driving method of claim 11, wherein, when the number of skip frames succeeding the refresh frame is in plurality, second on-bias stress voltages corresponding to a plurality of skip frames are different from each other.

14. The driving method of claim 10, wherein, when a luminance of the at least one skip frame is lower than a luminance of the refresh frame, the second on-bias stress voltage is lower than the first on-bias stress voltage.

15. The driving method of claim 10, wherein, when a luminance of the at least one skip frame is higher than a luminance of the refresh frame, the second on-bias stress voltage is higher than the first on-bias stress voltage.

16. The driving method of claim 10, further comprising:

supplying the at least one pixel with an emission control signal based on pulse width modulation so as to control an on and off timing of a light emitting device included in the at least one pixel, wherein an off duty cycle of the emission control signal comprises a first off duty cycle and a second off duty cycle which is longer than the first off duty cycle.

17. The driving method of claim 16, wherein the first off duty cycle is provided between on duty cycles of the refresh frame and between on duty cycles of the at least one skip frame, and the second off duty cycle is provided immediately before a first on duty cycle of the refresh frame, immediately after a last on duty cycle of the at least one skip frame, and between a last on duty cycle of the refresh frame and a first on duty cycle of the at least one skip frame.

18. The driving method of claim 16, wherein an on duty cycle of the emission control signal has a same length in the refresh frame and the at least one skip frame.

* * * * *